United States Patent Office 3,655,587
Patented Apr. 11, 1972

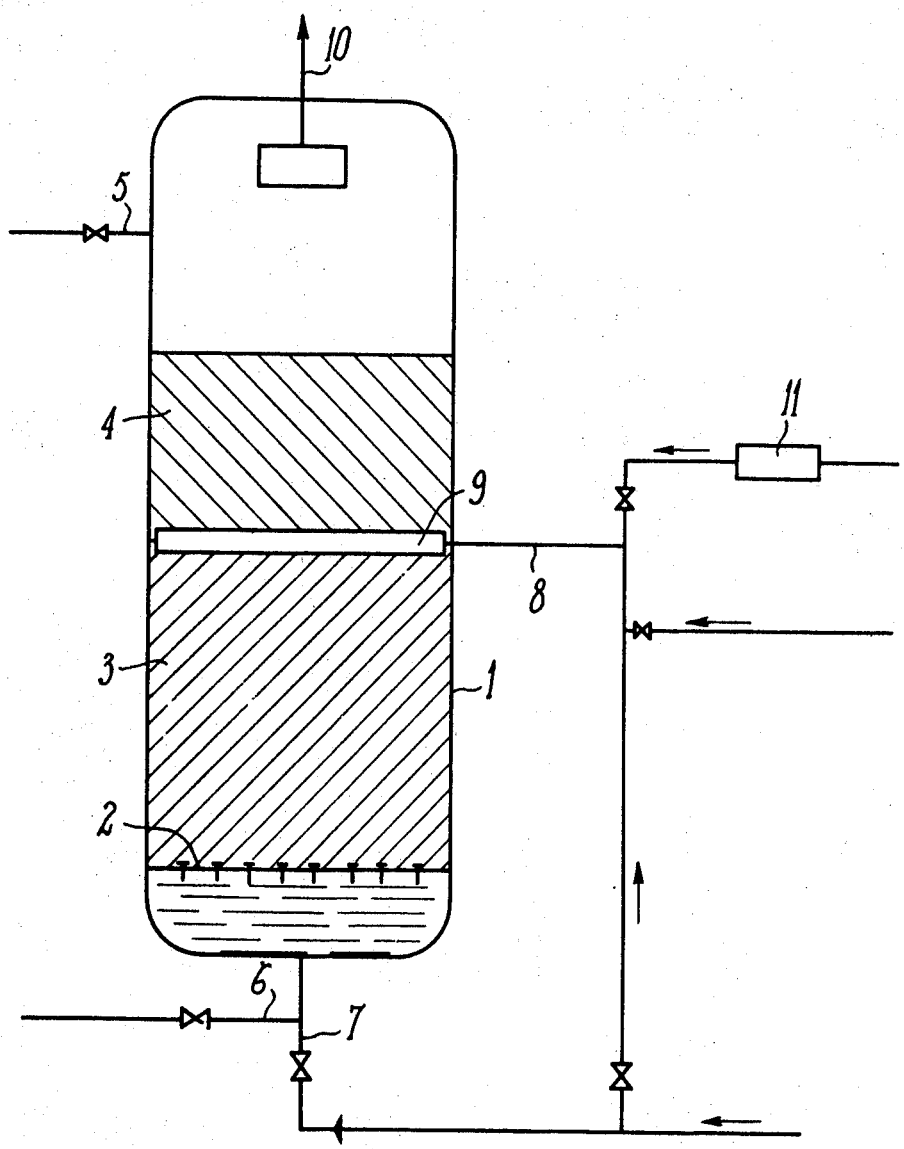

3,655,587
METHODS AND DEVICES FOR THE REGENERATION OF ION EXCHANGERS
Jean Bouchard, Paris, Roger Frison, Nanterre, and Pierre Treille, Saint-Cloud, France, assignors to Degremont, Societe Generale d'Epuration et d'Assainissement, Rueil-Malmaison, France
Filed Sept. 11, 1970, Ser. No. 71,310
Claims priority, application France, Oct. 14, 1969, 35,091
Int. Cl. B01d *15/06*; C02b *1/76*
U.S. Cl. 260—2.1 R     8 Claims

ABSTRACT OF THE DISCLOSURE

Method for regeneration of ion exchangers having the same ionic nature and disposed in superposed layers in the same apparatus, said ions being saturated by circulating the liquid to be treated in downward flow through the superposed layers of ion exchangers which are regenerated by circulating the regeneration reagent in countercurrent flow through the layers of ion exchangers. At least one regeneration reagent is passed upwards through the different superposed layers of ion exchangers and at least one additional stream of liquid is introduced in the vicinity of the interface between two superposed layers of ion exchangers, said additional stream being also circulated upwards through the layer or layers of ion exchangers together with the stream of regeneration reagent.

---

This invention relates to a method of regeneration of ion exchangers, namely cation or anion exchangers.

There are known advantages in the use of ion exchangers with countercurrent regeneration in which the regenerating reagent is employed in the direction opposite to adsorption; in particular, in the upflow regeneration process, the reagent first passes at a high concentration through the lower layers of cation or anion exchanger which are therefore strongly regenerated and consequently have remarkable efficiency in the subsequent adsorption stage, with the result that a liquid of high quality can be obtained. However, starting from the initial concentration, the reagent becomes progressively depleted as it passes through the ion exchanger. In point of fact, the adsorption of ions from the liquid to be treated is not carried out homogeneously in the layer of ion exchangers; another and more general consideration is that the quality of the liquid to be treated can vary in the course of time depending on the sources of supply and it must be possible to adapt the regeneration to the real distribution of adsorbed ions or to the changes in quality of the liquid to be treated.

It is also a known practice to associate two ion exchanger layers in series, the first layer having a weakly acidic (or basic) function, whilst the second layer has a strongly acidic (or basic) function. During the purification stage, the water or liquid to be treated passes successively through the first and the second layers. Under these conditions, the ions to be adsorbed are distributed between the two layers of exchanger, the first layer being saturated more or less completely and the second layer being employed up to the "vanishing point" of the ion which is the most mobile among those which it is desired to adsorb.

In the regeneration stage, the regenerating reagent is employed in the reverse order with respect to the adsorption process. Thus, the reagent first passes through the exchanger which has a strong function and then through the exchanger which has a weak function.

Regeneration of the strongly acidic exchanger calls for a substantial excess or reagent whilst the weakly acidic exchanger works with an efficiency which is close to theoretical.

As a result of the entire regeneration process, the combination of the two exchangers leads to an overall yield which is also in the vicinity of the theoretical value since it is the excess of free reagent in the initial regeneration of the substance having a strong function which is employed for total regeneration of the substance having a weak function.

It is also known that the regeneration of a substance having a strong function is an equilibrium reaction which is retarded by the reverse reaction.

For example, in an exchange of hydrogen cations with sodium chloride which has previously been adsorbed, by means of hydrochloric acid, the adsorption reaction is the typical equilibrium reaction:

$$R \cdot H + NaCl \rightleftharpoons R \cdot Na + HCl$$

Similarly, regeneration of a strongly basic anion exchanger saturated with chlorine ions as performed by means of a sodium hydroxide solution is balanced by the reverse reaction: production of sodium hydroxide from a resin in hydroxyl form which is treated with sodium chloride:

$$NaOH + RCl \rightleftharpoons NaCl + R \cdot OH$$

In consequence, efficiency of regeneration entails the need for stringent conditions of concentration, contacting times between the liquid and the solid and compactness of the resin bed, the last-named factor being essential if it is desired to carry out the regeneration process with optimum efficiency in a reasonably short time.

On the contrary, the regenerations of cation or anion exchangers having a weak function are in fact total reactions.

In the reaction: $R \cdot Na + HCl \rightarrow R \cdot H + NaCl$ as applied to a carboxylic resin, the reverse reaction is impossible since the acidity of the resin is too low to permit liberation of HCl.

Similarly, in the reaction

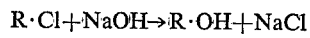
$$R \cdot Cl + NaOH \rightarrow R \cdot OH + NaCl$$

as applied to a weakly basic resin, the reverse reaction is impossible since the basicity of the resin is too low to permit liberation of NaOH.

As a consequence this type of regeneration can take place in a dilute solution and in an expanded medium without any detriment to its efficiency.

Moreover, a certain number of utilization factors can lead to optimum conditions of temperature and concentration which are different for both types of resin.

Thus, it follows that in sulphuric-acid regeneration of a system of cation exchangers, it is an advantage to regenerate the carboxylic exchanger at a very low concentration whereas this procedure is not conducive to complete regeneration of the strongly acidic exchanger of the sulphonic acid type.

Similarly, it is found preferable to regenerate a strongly basic exchanger at a concentration and temperature which are higher than those imposed by the use of a weakly basic exchanger.

Finally, in order to obtain the highest yield and the best quality of treated liquid from a given weight of regenerant, a known method of practical interest consists in passing the solution of reagent in the direction opposite to the solution to be treated through each of the two layers of exchangers.

The object of this invention is to provide a method for the regeneration of ion exchangers having the same ionic sign and arranged in superposed layers within the same apparatus and to meet practical requirements more effectively than comparable methods employed in the prior art for regeneration of ion exchangers disposed in superposed layers, especially insofar as the method takes strictly into account the conditions of concentration, the times of contacting between the liquid and the solid and the compactness of the resin bed, which were mentioned earlier; a further object of this invention is to provide a device which is suited for carrying out the aforesaid method for the regeneration of ion exchangers.

The invention is directed to a method for regeneration of ion exchangers having the same ionic nature and disposed in superposed layers in the same apparatus, said ions being saturated by circulating the liquid to be treated in downward flow, for example, through the superposed layers of ion exchangers which are regenerated by circulating the regeneration reagent in countercurrent flow through the layers of ion exchangers, said method being characterized in that at least one regeneration reagent is passed upwards through the different superposed layers of ion exchangers and in that at least one additional stream of liquid is introduced in the vicinity of the interface between two superposed layers of ion exchangers, said additional stream being also circulated upwards through the layer or layers of ion exchangers together with the stream of regeneration reagent.

In an advantageous arrangement of the method according to the present invention, the additional stream or streams of liquid introduced in the vicinity of the interface between two superposed layers of ion exchangers is (are) an agent for diluting the regeneration reagent.

In another advantageous arrangement of the method according to the present invention, the additional stream or streams of liquid introduced in the vicinity of the interface between two superposed layers of ion exchangers is (are) at a temperature which is different from that of the regeneration reagent.

In a third advantageous arrangement of the method according to the present invention, the flow rate of the additional stream or streams of liquid introduced in the vicinity of the interface between two layers of ion exchangers is different from the flow rate of the regeneration reagent which is introduced at the bottom of the ion-exchange column, thereby varying the rate of percolation of the regeneration reagent within the top layer or layers of ion exchangers.

In accordance with one advantageous mode of execution of the invention, the method which is contemplated by the present invention is preferably applicable to the case of ion exchangers having the same ionic nature which are disposed in superposed layers having different functions.

This invention is also concerned with a device which serves to carry out the method according to the present invention; said device comprises a column at the bottom of which is disposed a grid or the like for supporting the layers of ion exchangers as well as pipes for admission of liquid to be treated at the top of the column, for withdrawal of treated liquid at the bottom of the column, for admission of regeneration reagent at the bottom of the column, for discharge of effluents, and can be associated if necessary with devices for modifying temperature, flow rate and so forth, provision being essentially made for at least one pipe for the admission of one or a number of additional streams of liquid substantially at the interface between two superposed layers of ion exchangers.

Apart from the arrangements which have just been mentioned, the invention comprises further arrangements which will be brought out in the following description.

The present invention is particularly directed to the methods of regeneration of ion exchangers in accordance with the foregoing arrangements and also to the devices for carrying out said methods, the elements which are suited for the utilization and development of said methods and devices, as well as the processes and/or installations which embody the methods and/or devices in accordance with the arrangements of the present invention.

A better understanding of the invention can be gained from the complementary description which is given hereinafter, reference being made to the accompanying drawing which is a diagrammatic presentation of a device for carrying out the method according to the invention, said method being in turn disclosed in the examples which are given in the remaining part of this description.

However, it must be understood that the accompanying drawing and the corresponding parts of the description as well as the examples of execution of the method according to the invention are given solely by way of explanatory illustration of the objects of the invention and not in any sense by way of limitation.

The apparatus which is employed for carrying out the regeneration of ion exchangers disposed in superposed layers is constituted by a colum 1 at the bottom of which is placed a grid 2 or the like for supporting the ion-exchange resins. Said grid 2 serves to support a column of ion-exchange resins which are arranged in superposed layers. As shown in the drawing, said ion-exchange column comprises two superposed layers 3 and 4 having the same ionic nature, namely either cationic or anionic; one of the layers designated by the reference numeral 3 has a strongly acidic function whereas the other layer which is designated by the numeral 4 has a weakly acidic function. However, it is apparent that said superposed layers could also have the same function and be distinguished solely by their granular size, for example, or by any other factor. It is also obvious that, depending on the treatment to be performed within the column, provision could be made for a plurality of ion-exchanger layers (i.e. more than two) which are in superposed relation within the same apparatus 1.

The liquid to be treated is admitted into the top of the column 1 via the pipe 5, passes in downward flow through the superposed layers of ion exchangers and is then collected at the bottom of the column 1 via the pipe 6. The regeneration reagent is introduced into the bottom of the column 1 via the pipe 7 and flows upwards through the entire column of superposed layers 3, 4 of ion-exchange resins.

An additional stream of liquid is conveyed through a pipe 8 to a distribution grid 9 (or any like distribution means) which is located at the interface between the two ion-exchange resin layers. At this level, said additional stream meets the stream of regeneration reagent and passes with this latter through the ion-exchange resin layer 4. This additional stream can consist of water for diluting the regeneration reagent which flows through the layer 4; alternatively, it can consist of another regeneration reagent which can accordingly produce action on the exchanger of the top layer 4 when employed either alone or in combination with the reagent which is fed into the bottom of the column 1.

The effluents are collected at the top of the column 1 via the pipe 10.

A heat exchanger 11 can be interposed in the pipe 9 for admission of the additional stream of liquid in order to regulate the temperature of this latter and consequently to permit modification of the regeneration temperature within the top layer 4 of ion exchangers.

It is also possible to interpose within the pipe 9 a device for regulating the flow rate of the additional stream of liquid and this device can be coupled with the heat exchanger if necessary.

In accordance with the present invention and with reference to the embodiment which is illustrated in the accompanying drawing, there are selected two ion exchangers having densities such that the the resin bed 4 with a weak acidity function is placed above the resin bed 3 with a strong acidity function as a result of a simple countercurrent flow of water.

Taking into account the arrangement of the means 5 for admission of liquid to be treated and the means 7 for admission of the regeneration reagent, the liquid to be treated percolates downwards through the ion-exchanger layers whilst the regeneration reagent percolates upwards through these latter.

The distribution grid 9 or the like permits uniform introduction of a variable flow of water for dilution or dissolution of reagent.

The rate of introduction of the regeneration reagent into the bottom of the column of superposed ion-exchanger layers is regulated so that the bottom resin layer 3 should be uniformly irrigated by the reagent without undergoing expansion.

The flow rate of the additional stream of liquid, namely water or reagent which is introduced though the distribution grid 9, is regulated so as to obtain through the top layer 4 the desired concentration and/or temperature while maintaining the resin which constitutes said layer 4 in a state of moderate expansion.

The depleted reagent is discharged to waste through a draining-off device 10 which is located above the two superposed ion-exchanger layers.

Finally, the reagent is displaced within the ion-exchange column by an inflow of water which is supplied through the lower distribution device.

In the examples which now follow, the modes of application of the method according to the present invention will be described solely in order to illustrate the object of the invention and are not intended to imply any limitation.

EXAMPLE 1

A strongly basic anion exchange resin having normal porosity and a weakly basic anion exchange resin of the microporous type are employed in combination and have densities such that the last-mentioned resin is placed completely above the first solely by means of a countercurrent flow of water.

In order to ensure correct regeneration, the strongly basic resin calls for a sodium hydroxide solution at a minimum concentration of 4% and at a temperature of the order of 40° to 50° C.

On the contrary, the weakly basic resin does not readily permit concentrations higher than 2% and temperatures higher than 35° C.

In accordance with the present invention, the sodium hydroxide is fed into the bottom of the apparatus at the concentrations and temperatures which have been mentioned above. By adding through the distribution grid located at the interface between the two layers a stream of cold water at a rate of flow at least equal to that of the 4% sodium hydroxide solution, the conditions required by the weakly basic resin are readily obtained.

EXAMPLE 2

Plain, untreated water which contains a high proportion of calcium ions whilst the remaining salinity consists of magnesium and sodium salts is treated on a bed formed by a layer of carboxylic cation-exchangers superposed on a layer of sulphonic-acid cation exchangers in a hydrogen cycle.

During adsorption, the ions are placed in the order Ca-Mg-Na so that the calcium is accordingly concentrated in the carboxylic resin.

Regeneration of the whole is carried out in countercurrent flow by means of a sulphuric acid solution. It is preferable to regenerate the sulphonic acid resin with a flow rate which is as low as possible in order to prevent swelling of the resin as this would make it necessary in practice to limit the volume of dilute acid to be employed and therefore to adopt a relatively high concentration of 3 to 4%, for example.

On the other hand, should it be found desirable to prevent precipitation of calcium sulphate in the carboxylic exchanger, it becomes necessary to limit the concentration of the sulphuric acid to very low values between 0.5 and 0.6%, for example.

Moreover, whereas the efficiency of the regeneration process would be impaired by causing expansion or swelling of the sulphonic acid exchanger, no disadvantage of this kind would arise from an increase in volume of the carboxylic exchanger.

In consequence, an operation in which these contradictory data are reconciled can very readily be performed by diluting the initial solution with an additional qquantity of water supplied through the central grid so as to collect a final solution having a suitable concentration.

It is apparent from the foregoing description that, irrespective of the modes or utilization, development and application which are adopted, the methods and devices thus obtained for the regeneration of ion exchangers offer substantial advantages over the methods and devices employed for the same purpose in the prior art, the most important of these advantages having already been noted earlier.

As has been brought out in the foregoing, the invention is not limited in any respect to those modes of utilization, development and application which have been more specifically described hereinabove but extends on the contrary to all alternative forms which may become apparent to anyone skilled in the art without thereby departing either from the scope or the spirit of the invention.

What we claim is:

1. A method for regeneration of ion exchangers having the same ionic nature and disposed in superposed layers in the same apparatus, said ions being saturated by circulating the liquid to be treated in downward flow through the superposed layers of ion exchangers which are regenerated by circulating the regeneration reagent in countercurrent flow through the layers of ion exchangers, wherein at least one regeneration reagent is passed upwards through the different superposed layers of ion exchangers and wherein at least one additional stream of liquid is introduced in the vicinity of the interface between two superposed layers of ion exchangers, said additional stream being also circulated upwards through the layer or layers of ion exchangers together with the stream of regeneration reagent.

2. A method according to claim 1, wherein the additional stream or streams of liquid introduced in the vicinity of the interface between two superposed layers of ion exchangers is (are) an agent for diluting the regeneration reagent.

3. A method according to claim 1, wherein the additional stream or streams of liquid introduced in the vicinity of the interface between two superposed layers of ion exchangers is (are) at a temperature which is different from that of the regeneration reagent.

4. A method according to claim 1, wherein the flow rate of the additional stream or streams of liquid introduced in the vicinity of the interface betwen two layers of ion exchangers produces a variation in the rate of percolation of the regeneration reagent within the top layer or layers of ion exchangers so as to make it possible in particular to regenerate the top layer or layers in the expanded state whilst the bottom layer is regenerated in the compact state.

5. A method according to claim 1, wherein at least one of the additional streams of liquid introduced in the vicinity of the interface between two superposed layers of ion exchangers is a reagent consisting of a chemical substance which is different from that of the reagent introduced at the bottom of all the layers of ion exchangers.

6. A method according to claim 1, wherein the liquid introduced in the vicinity of the interface between the different layers of ion exchangers is a concentrated solution of the reagent which is introduced at the bottom of all the layers, said bottom introduction being carried out in the form of a dilute solution.

7. A method of regeneration of ion exchangers according to claim 1, wherein the additional stream or streams is (are) introduced separately from the stream of regeneration reagent which passes through all the layers of ion exchangers.

8. Application of the method according to claims 1 to 7 to the case of ion exchangers having the same ionic nature which are disposed in superposed layers having different chemical functions.

References Cited

UNITED STATES PATENTS

| | | | |
|---|---|---|---|
| 3,382,169 | 5/1968 | Thompson | 210—32 |
| 3,394,079 | 7/1968 | Miller et al. | 210—33 |

MELVIN GOLDSTEIN, Primary Examiner

U.S. Cl. X.R.

210—30; 260—2.2 R